(12) United States Patent
Mishima

(10) Patent No.: US 8,879,866 B2
(45) Date of Patent: Nov. 4, 2014

(54) IMAGE PROCESSING CIRCUIT, SEMICONDUCTOR DEVICE, IMAGE PROCESSING DEVICE, AND ELECTRONIC APPLIANCE

(75) Inventor: Kazuma Mishima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 83 days.

(21) Appl. No.: 13/439,281

(22) Filed: Apr. 4, 2012

(65) Prior Publication Data

US 2012/0257828 A1     Oct. 11, 2012

(30) Foreign Application Priority Data

Apr. 8, 2011   (JP) .................................. 2011-086096
Mar. 28, 2012  (JP) .................................. 2012-073857

(51) Int. Cl.
| G06K 9/00 | (2006.01) |
| G06K 9/40 | (2006.01) |
| H04N 9/67 | (2006.01) |
| H04N 9/64 | (2006.01) |

(52) U.S. Cl.
CPC . *H04N 9/643* (2013.01); *H04N 9/67* (2013.01)
USPC ............................. 382/274; 382/162; 382/167

(58) Field of Classification Search
CPC . H04N 1/6002; H04N 1/6005; H04N 1/6075; H04N 9/643
USPC ........................................................... 382/277
See application file for complete search history.

(56) References Cited

U.S. PATENT DOCUMENTS

| 5,999,230 | A  | * | 12/1999 | Tanabe ........................... 348/649 |
| 7,369,285 | B2 | * | 5/2008  | Morikawa ...................... 358/521 |
| 7,580,169 | B2 | * | 8/2009  | Fukuda .......................... 358/538 |
| 7,586,640 | B2 | * | 9/2009  | Hoshuyama .................... 358/1.9 |
| 2003/0053689 | A1 | * | 3/2003 | Watanabe et al. .............. 382/167 |
| 2006/0250670 | A1 | * | 11/2006 | Tsukioka ....................... 358/518 |
| 2009/0022396 | A1 | * | 1/2009 | Watanabe et al. .............. 382/167 |
| 2010/0226572 | A1 | * | 9/2010 | Adachi .......................... 382/167 |
| 2011/0090369 | A1 | * | 4/2011 | Yanagita et al. ............... 348/234 |
| 2011/0181785 | A1 | * | 7/2011 | Masuda et al. ................ 348/624 |
| 2011/0187735 | A1 | * | 8/2011 | Kondoh et al. ................ 345/589 |

FOREIGN PATENT DOCUMENTS

JP     2010-074317     4/2010

* cited by examiner

*Primary Examiner* — Anand Bhatnagar
*Assistant Examiner* — Soo Park
(74) *Attorney, Agent, or Firm* — Fish & Richardson P.C.

(57) ABSTRACT

An image processing circuit includes: a correction amount calculation section which calculates a correction amount from area-by-area correction amounts set respectively for two, corresponding to the hue of input image data, out of a plurality of areas into which the hue/saturation plane is divided; and a color correction processing section which generates output image data by subjecting the input image data to color correction processing according to the correction amount.

13 Claims, 14 Drawing Sheets

IMAGE PROCESSING CIRCUIT, SEMICONDUCTOR DEVICE, IMAGE PROCESSING DEVICE, AND ELECTRONIC APPLIANCE

This application is based upon and claims the benefit of priority from the corresponding following Japanese Patent Applications, the entire contents of which are incorporated herein by reference.
(1) Japanese Patent Application No. 2011-086096 (filed Apr. 8, 2011)
(2) Japanese Patent Application No. 2012-073857 (filed Mar. 28, 2012)

BACKGROUND OF THE INVENTION

1. Field of the Invention

The present invention relates to an image processing circuit, a semiconductor device into which the same is integrated, and an image processing device and electronic appliance (for example, a mobile telephone (smartphone), a digital still camera, a digital video camera, and a television broadcast receiver device) using the same.

2. Description of Related Art

There have been proposed image processing circuits in which color correction processing is performed upon input image data in an HLS color space (cf. FIG. 9) expressing the three values of hue H, lightness L, and saturation S to produce output image data.

So-called selective color correction is known as a technology related to color correction processing in an HLS color space. In selective color correction, a hue/saturation plane is divided into a plurality (for example, twenty-four) of areas according to hue H, in each of which correction amounts for hue H, lightness L, saturation S can be set (cf. FIG. 10).

One example of prior art related to the art described above is Unexamined Japanese Patent Application Publication 2010-74317.

However, in existing selective color correction, the correction amounts for hue H, lightness L, and saturation S are set uniformly across each of the areas of the hue/saturation plane. For this reason, there has arisen the problem that, when the correction amounts set for two adjacent areas greatly differ, unnatural correction results will be obtained for the border parts between the areas.

Also, in existing selective color correction, color correction processing at a uniform correction amount is performed both on pixels with low lightness L and saturation S and on pixels with high L and S. For this reason, there has been a problem that noise components for pixels with low lightness L and saturation S (pixels including large amounts of noise components) are unnecessarily increased.

SUMMARY OF THE INVENTION

The present invention was contrived in view of the above problems discovered by the inventors, it being an object thereof to provide an image processing circuit capable of performing appropriate color correction processing, and a semiconductor device into which same is integrated, and an image processing device and electronic appliance using same.

In order to achieve the above object, the image processing circuit disclosed herein comprises: a correction amount calculation section which calculates a correction amount from area-by-area correction amounts set respectively for two, corresponding to the hue of input image data, out of a plurality of areas into which a hue/saturation plane is divided; and a color correction processing section which generates output image data by subjecting the input image data to color correction processing according to the correction amount.

Further features, elements, steps, advantages, and characteristics of the present invention will become apparent from the detailed description of the best mode for embodying the invention and the attached drawings relating thereto given below.

DETAILED DESCRIPTION OF PREFERRED EMBODIMENTS

<Block Diagram>

Figure 1:
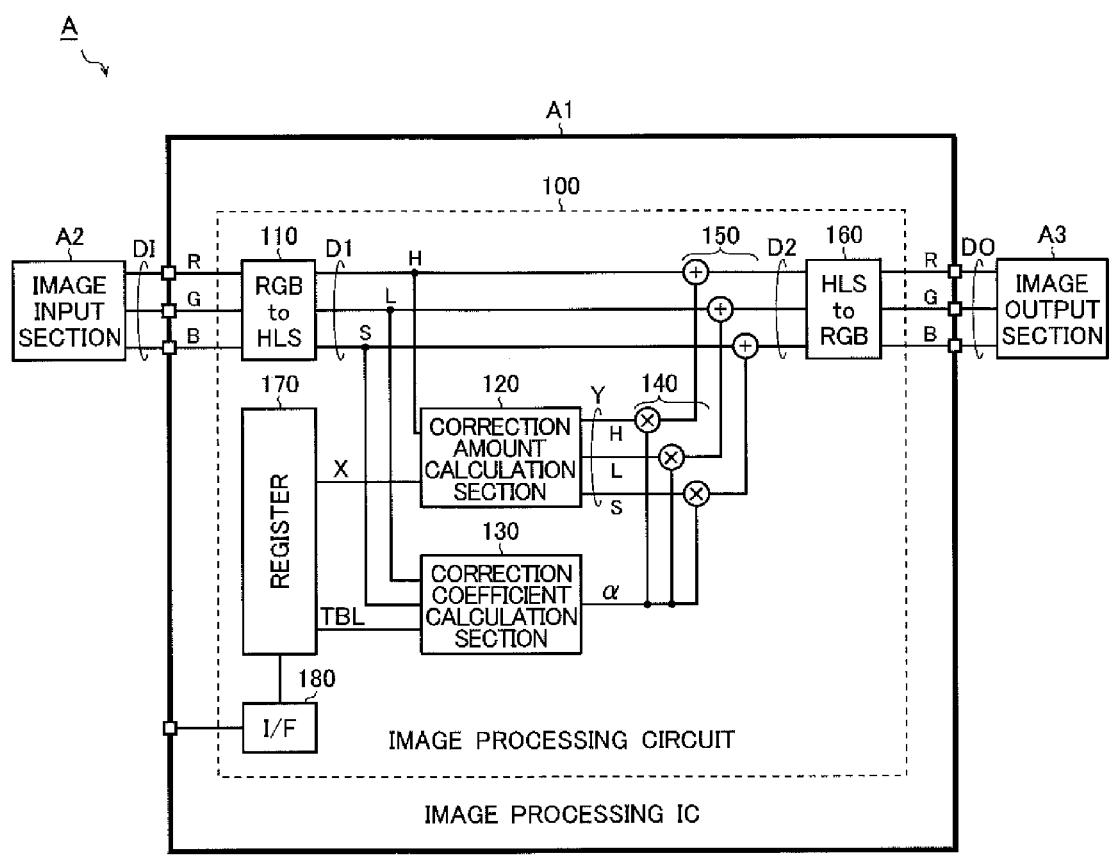
FIG. 1 is a block diagram of one embodiment of an image processing device.

FIG. 1 is a block diagram of one embodiment of an image processing device. An image processing device A according to the present embodiment has a semiconductor device A1, an image input section A2, and an image output section A3.

The semiconductor device A1 is an image processing IC having an integrated image processing circuit 100. The image processing circuit 100 performs predetermined color correction processing upon input image data DI and forms output image data DO. The configuration and operation of the image processing circuit 100 will be described in detail below.

The image input section A2 supplies the input image data DI to the semiconductor device A1. A camera device, media replay device, broadcast receiver device or the like can be used as the image input section A2. A digital video camera for taking dynamic images, a digital still camera for taking still image, or the like can be used as the camera device. When a camera device is used as the image input section A2, the input image data DI is a camera image obtained by the camera device. Apart from a drive device having a function of replaying various types of media (video CD, DVD, Blu-ray disc, hard disc, semiconductor memory, and the like), a personal computer or the like having a function of replaying video content provided over the Internet can be used as the media replay device. When a media replay device is used as the image input section A2, the input image data DI is a replay image obtained by the media replay device. A receiver device or the like for receiving television broadcasts can be used as the broadcast receiver device. When a broadcast receiver device is used as the image input section A2, the input image data DI is a received image obtained by the broadcast receiver device.

The image output section A3 displays an image corresponding to the output image data DO upon which the predetermined image processing has been performed by the semiconductor device A1. An LCD or an organic EL display can be favorably used as the image output section A3.

<Image Processing Circuit>

Next, the configuration and operation of the image processing circuit 100 will be described in detail. The image processing circuit 100 has a first data format converter section 110, the correction amount calculation section 120, the correction coefficient calculation section 130, a multiplier section 140, a color correction processing section 150, a second data format converter section 160, a register 170, and an interface section 180.

The first data format converter section 110 converts RGB format input image data DI (red R, green G, blue B) inputted from the image input section A2 to HLS format input image data D1 (hue H, lightness L, saturation S), and outputs the data to the correction amount calculation section 120, correction coefficient calculation section 130, and color correction processing section 150.

The correction amount calculation section 120 calculates a correction amount Y from an area-by-area correction amount x set for each of two areas, out of the plurality of areas into which a hue/saturation plane is divided, corresponding to the hue H of the input image data D1. The correction amount calculation section 120 calculates correction amounts Y_H, Y_L, and Y_S for the hue H, lightness L, and saturation S of the input image data D1. When calculating the correction amount Y, the correction amount calculation section 120 refers to the area-by-area correction amount x stored in the register 170. The configuration and operation of the correction amount calculation section 120 will be described in detail below.

The correction coefficient calculation section 130 calculates a correction coefficient α according to the lightness L and the saturation S of the input image data D1. When calculating the correction coefficient α, the correction coefficient calculation section 130 refers to a correction coefficient table TBL stored in the register 170. The configuration and operation of the correction coefficient calculation section 130 will be described in detail below.

The multiplier section 140 multiplies the correction amount Y by the correction coefficient α and outputs the product to the color correction processing section 150.

Figure 2:
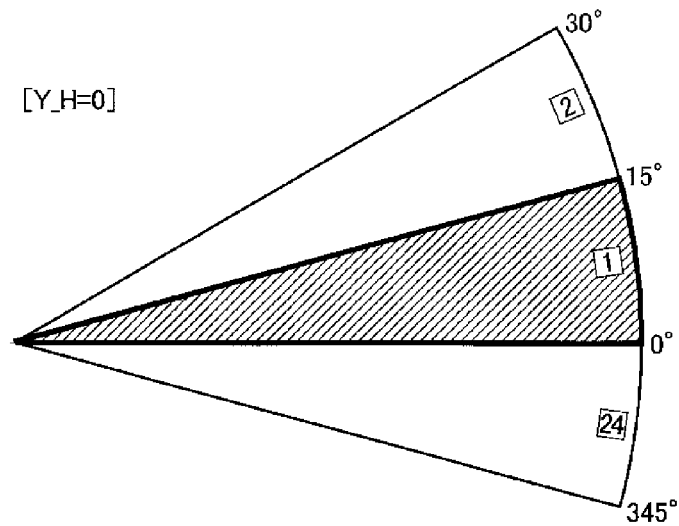
FIG. 2 is a diagram of a hue/saturation plane for illustrating a hue H correction operation.
Figure 2:
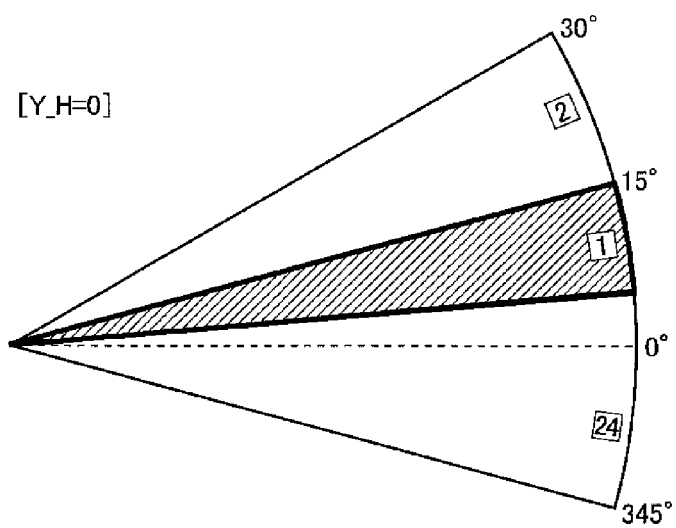
Figure 2:
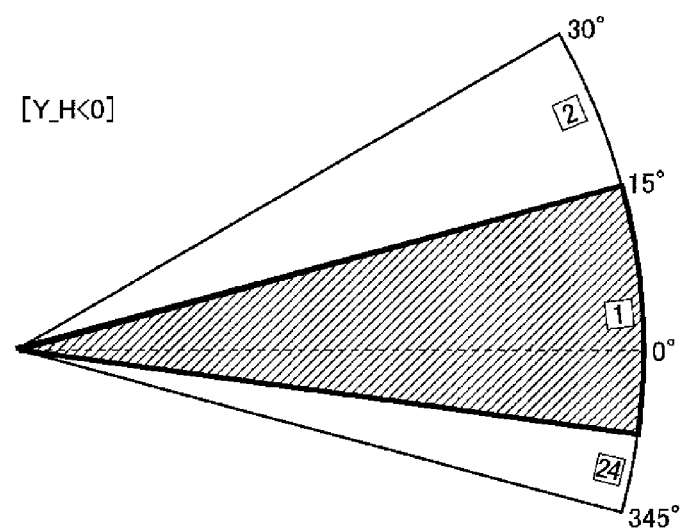
Figure 3:
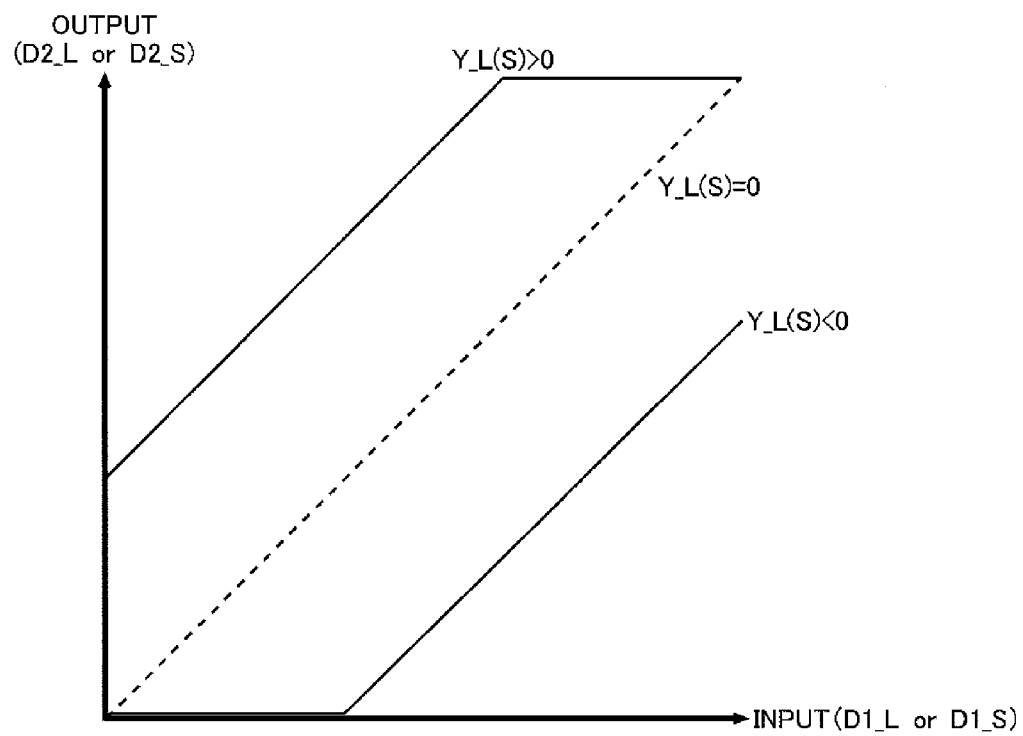
FIG. 3 is an input/output correlation graph illustrating a lightness L (or saturation S) correction operation.

The color correction processing section 150 performs color correction processing on the input image data D1 according to the correction amount (α×Y), and outputs output image data D2. FIG. 2 illustrates a first area being corrected by the hue correction amount Y_H. FIG. 3 illustrates the lightness L (or saturation S) of the output image data D2 being increased or decreased by the lightness correction amount Y_L (or saturation correction amount Y_S).

The second data format converter section 160 converts the HLS format output image data D2 inputted from the color correction processing section 150 to RGB format output image data DO, and outputs the data to the image output section A3.

The register 170 stores the area-by-area correction amounts X referred to by the correction amount calculation section 120 and the correction coefficient table TBL referred to by the correction coefficient calculation section 130. The correction coefficient table TBL includes a first correction coefficient table TBL_L in which the lightness L of the input image data D1 and a first correction coefficient LC are associated and a second correction coefficient table TBL_S in which the saturation S of the input image D1 and a second correction coefficient SC are associated. The first correction coefficient table TBL_L and the second correction coefficient table TBL_S are provided in a plurality of patterns (for example, for the red (R) area, for the green (G) area, for the blue (B) area, and for the flesh (Y) area) corresponding to the hue H of the input image data D1. Thus, the first correction coefficient table TBL_L and second correction coefficient table TBL_S having the plurality of patterns corresponding to the hue H of the input image data D1 are referred to by the correction coefficient calculation section 130.

It is sufficient for discrete first correction coefficients LC for the lightness L of the input image data D1 to be set in the first correction coefficient table TBL_L, and for the correction coefficient calculation section 130 to supplement the areas between the discrete values. Similarly, it is sufficient for discrete second correction coefficients SC for the saturation S of the input image data D1 to be set in the second correction coefficient table TBL_S, and for the correction coefficient calculation section 130 to supplement the areas between the discrete values. Adopting such a configuration enables the amount of data in the correction coefficient table TBL (and, by extension, the scale of the circuitry of the register 170) to be condensed. While not shown in FIG. 1, various types of parameters used in the image processing circuit 100 are stored in the register 170 as appropriate.

The interface section 180 is a front end for rewriting and accessing the contents of the register 170 (including the area-by-area correction amount x and correction coefficient table TBL) from without the semiconductor device A1. When such a configuration, in which a user can rewrite the area-by-area correction amount x and correction coefficient table TBL at will, is adopted, the color correction processing can be finely adjusted according to user tastes and image content.

Figure 9:
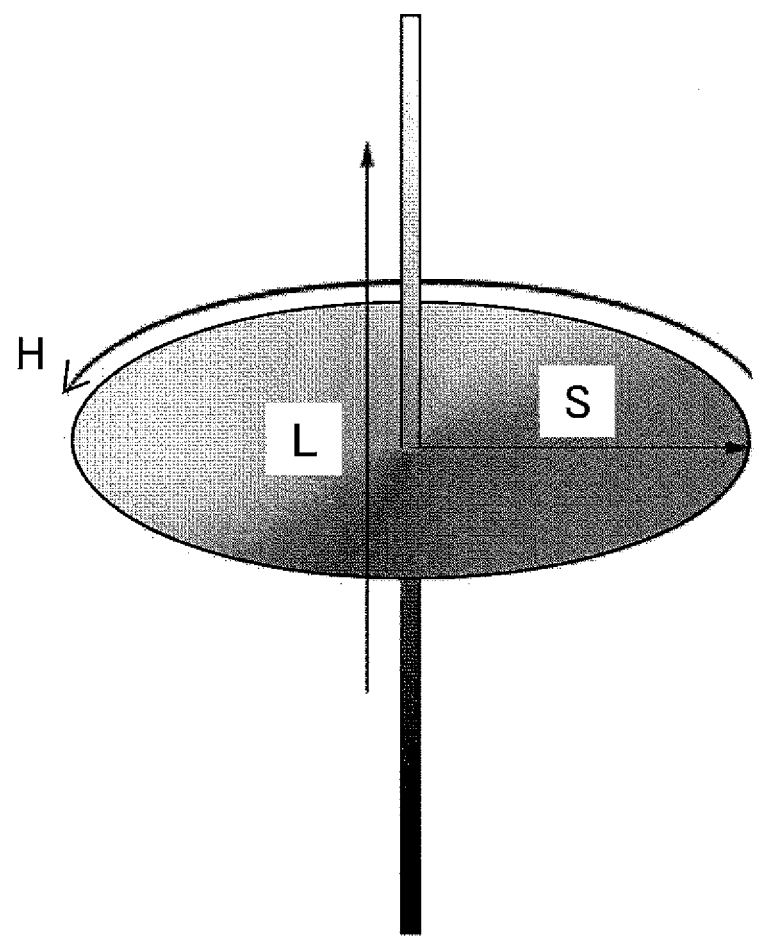
FIG. 9 is a conceptual schematic illustration of an HLS color space.
Figure 10:
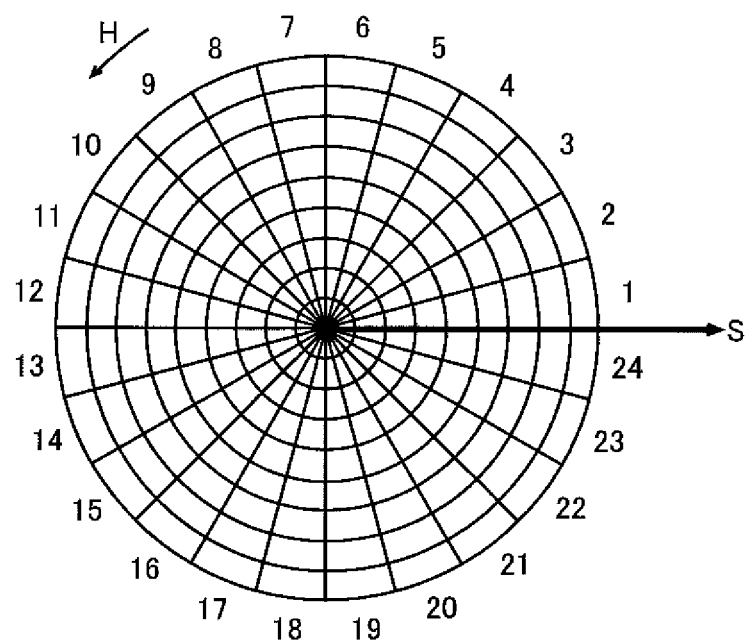
FIG. 10 is a diagram of a hue/saturation plane for describing selective color correction.

The image processing circuit 100 having the configuration described above performs selective color correction upon the input image data DI in an HLS color space (cf. FIG. 9) expressing the three values of hue H, lightness L, and saturation S to produce output image data DO. In selective color correction, a hue/saturation plane is divided into a plurality of areas (for example, twenty-four) according to hue H, in each of which correction amounts for hue H, lightness L, saturation S can be set (cf. FIG. 10).

Hue H is a parameter expressing pixel hue (specific color) as an angle from 0° to 359°. H=0° corresponds to red, and H=180° corresponds to blue green (the opposite of red). Lightness L is a parameter expressing pixel brightness as a percentage from 0% to 100%. L=0% corresponds to black, L=50% corresponds to a pure hue, and L=100% corresponds to white. Saturation S is a parameter expressing pixel vividness as a percentage from 0% to 100%. S=0% corresponds to gray, and S=100% corresponds to a pure hue.

<Correction Amount Calculation Section>

Figure 4:
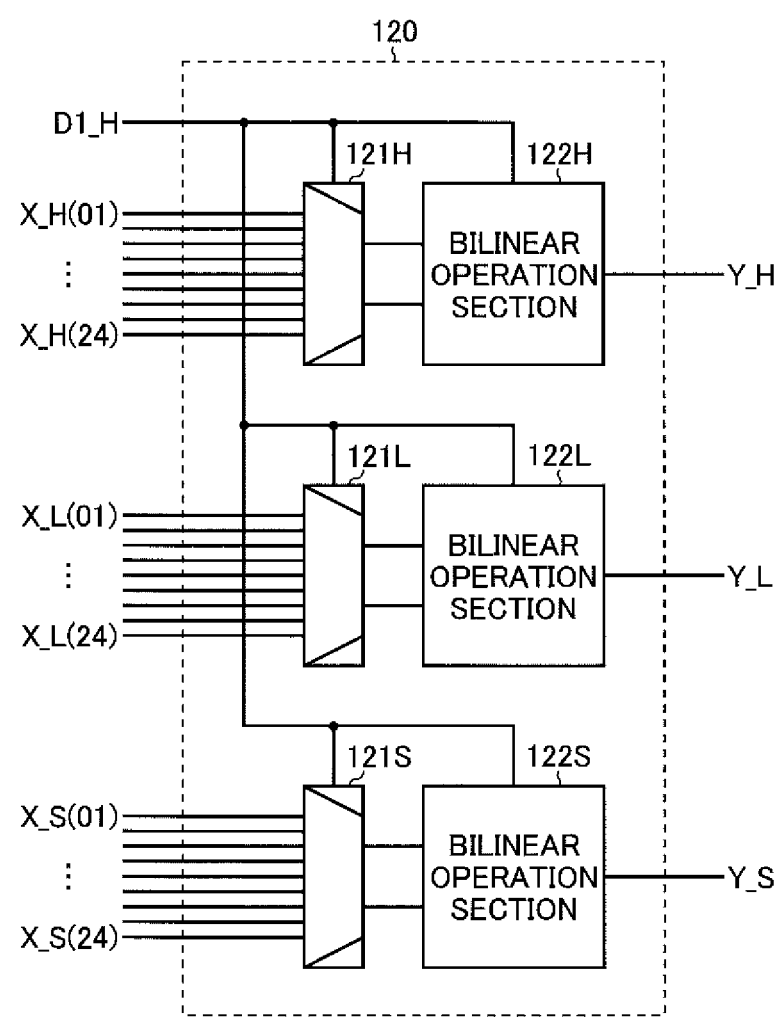
FIG. 4 is a block diagram showing one example of the configuration of a correction amount calculation section 120.

FIG. 4 is a block diagram showing one example of the configuration of a correction amount calculation section 120. The correction amount calculation section 120 having the configuration according to the present example includes a selector 121 (H, L, and S) and a bilinear operation section 122 (H, L, and S).

The selector 121H selects and outputs area-by-area hue correction amounts X_H(i) and X_H(j) (wherein i and j are adjacent areas; likewise hereafter) for each of two areas corresponding to the hue H of the input image data D1 out of area-by-area hue correction amounts X_H(01) through X_H(24) stored in the register 170.

The selector 121L selects and outputs area-by-area lightness correction amounts X_L(i) and X_L(j) for each of two areas corresponding to the hue H of the input image data D1 out of area-by-area lightness correction amounts X_L(01) through X_L(24) stored in the register 170.

The selector 121S selects and outputs area-by-area saturation correction amounts X_S(i) and X_S(j) for each of two areas out of area-by-area saturation correction amounts X_S(01) through X_S(24) stored in the register 170.

The bilinear operation section 122H calculates hue correction amount Y_H by means of bilinear operation processing of area-by-area hue correction amounts X_H(i) and X_H(j).

Bilinear operation section 122L calculates lightness correction amount Y_L by means of bilinear operation processing of area-by-area lightness correction amounts X_L(i) and X_L(j).

The bilinear operation section 122S calculates saturation correction amount Y_S by means of bilinear operation processing of area-by-area saturation correction amounts X_S(i) and X_S(j).

Figure 5:
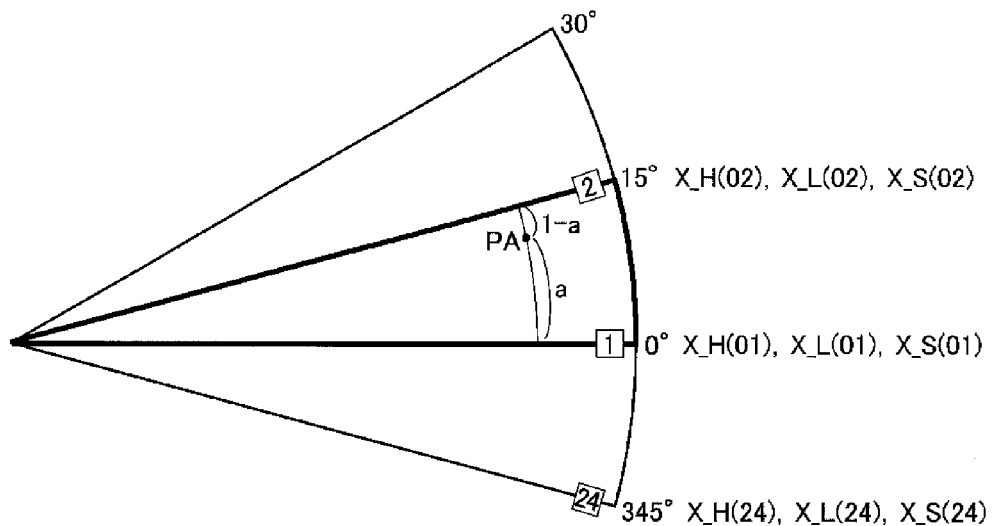
FIG. 5 is a diagram of a hue/saturation plane for illustrating a correction amount calculation operation.

FIG. 5 is a diagram of a hue/saturation plane for illustrating an operation of calculating correction amount Y (_H, L, S) by the bilinear operation section 122 (H, L, S). Here follows a description focusing on a pixel PA belonging to the first area)($0° \leq H < 15°$).

The hue H of the pixel PA is set at a value yielded by dividing an area, beginning at a hue)($0°$) constituting the starting point of the first area, between the hue at the starting point of the first area and a hue)($15°$) at a starting point of a second area by the ratio $a:(1-a)$ (wherein $0 \leq a < 1$). Here, the hue correction value Y_H(PA), the lightness correction value Y_L(PA), and the saturation correction value Y_S(PA) of the pixel PA are calculated according to the following formulas (1H), (1L), and (1S), respectively.

$$Y\_H(PA) = (1-a) \times X\_H(01) + a \times X\_H(02) \quad (1H)$$

$$Y\_L(PA) = (1-a) \times X\_L(01) + a \times X\_L(02) \quad (1L)$$

$$Y\_S(PA) = (1-a) \times X\_S(01) + a \times X\_S(02) \quad (1S)$$

A configuration in which a final correction amount Y is calculated on the basis of an area-by-area correction amount x set for two adjacent areas in this way enables natural correction results to be obtained for the border parts between the two areas.

It is also acceptable to divide the first area into two halves so that the final correction amount for pixels belonging to the first area is calculated from the area-by-area correction amounts for the first area and second area in the case of pixels positioned nearer the second area ($7.5° \leq H < 15°$), and from the area-by-area correction amounts for the first area and twenty-fourth area in the case of pixels positioned nearer the twenty-fourth area) ($0° \leq H < 7.5°$), and to select the area-by-area correction amount used to calculate the final correction amount.

<Correction Coefficient Calculation Section>

Figure 6:
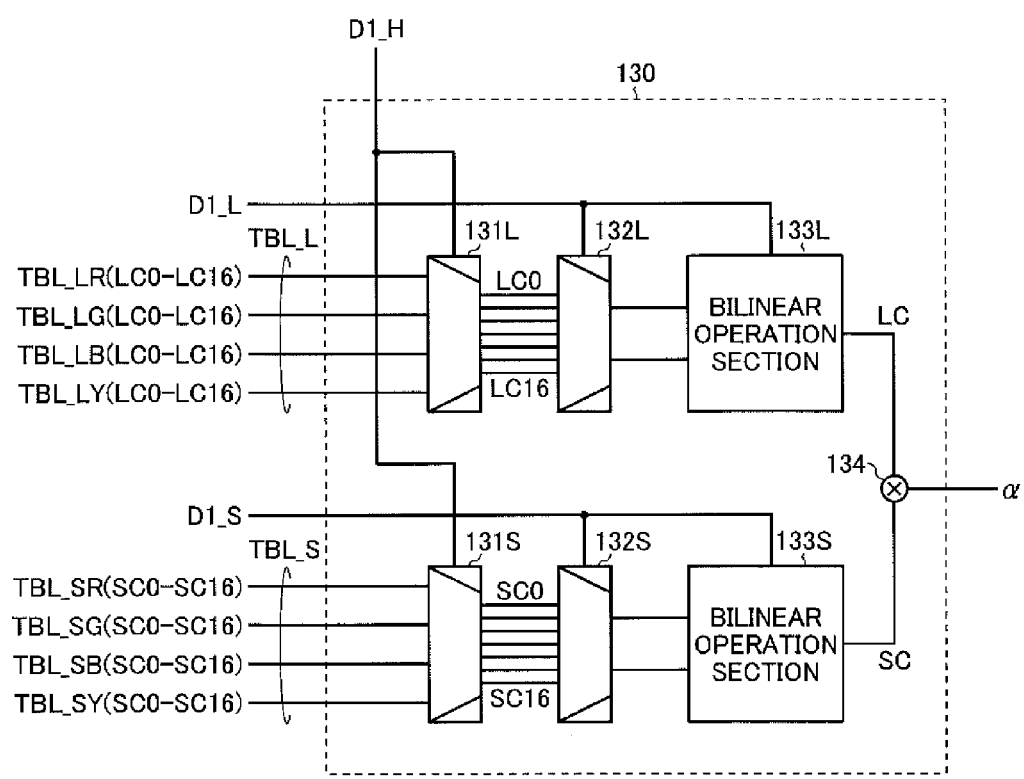
FIG. 6 is a block diagram showing one example of the configuration of a correction coefficient calculation section 130.

FIG. 6 is a block diagram showing one example of the configuration of a correction coefficient calculation section 130. The correction coefficient calculation section 130 having a configuration according to the present example includes a selector 131L and 131S, a selector 132L and 132S, a bilinear operation section 133L and 133S, and a multiplier section 134.

The selector 131L selects one out of the plurality of patterns (R, G, B, Y) of the first correction coefficient table TBL_L stored in the register 170 corresponding to the hue H of the input image data D1. For example, when the hue H of the input image data D1 belongs to the red (R) area, a first correction coefficient table TBL_LR for the red area is selected. Similarly, when the hue H of the input image data D1 belongs to the green (G) area, the blue (B) area, or the flesh (Y) area, a first correction coefficient table TBL_LG for the green area, a first correction coefficient table TBL_LB for the blue area, and a first correction coefficient table TBL_LY for the flesh area, respectively, are used.

The selector 131S selects one out of the plurality of patterns (R, G, B, Y) of the second correction coefficient table TBL_S stored in the register 170 corresponding to the hue H of the input image data D1. For example, when the hue H of the input image data D1 belongs to the red (R) area, a second correction coefficient table TBL_SR for the red area is selected. Similarly, when the hue H of the input image data D1 belongs to the green (G) area, the blue (B) area, or the flesh (Y) area, a second correction coefficient table TBL_SG for the green area, a second correction coefficient table TBL_SB for the blue area, and a second correction coefficient table TBL_SY for the flesh area, respectively, are used.

The selector 132L selects and outputs two values corresponding to the lightness L of the input image data D1 out of the plurality of first correction coefficients LC0 through LC16 included in the first correction coefficient table TBL_L selected by the selector 131L. For example, when first correction coefficients LC0 through LC16 are associated with every sixteen values for lightness L, which is capable of taking a value from 0 through 255, LC0 and LC1 are selected when the lightness L of the input image data D1 is from 0 to 15, and LC1 and LC2 are selected when the lightness L of the input image data D1 is from 16 to 31. In generalized terms, when the lightness L of the input image data D1 is in the range m to (m+15), LC(m) and LC(m+1) are selected (wherein m is an integer from 0 to 15).

The selector 132S selects and outputs two values corresponding to the saturation S of the input image data D1 out of the plurality of second correction coefficients SC0 through SC16 included in the second correction coefficient table TBL_S selected by the selector 131S. For example, when second correction coefficients SC0 through SC16 are associated with every sixteen values for a saturation S, which is capable of taking a value from 0 through 255, SC0 and SC1 are selected when the saturation S of the input image data D1 is from 0 to 15, and SC1 and SC2 are selected when the saturation S of the input image data D1 is from 16 to 31. In generalized terms, when the saturation S of the input image data D1 is in the range m to (m+15), SC(m) and SC(m+1) are selected (wherein m is an integer from 0 to 15).

The bilinear operation section 133L calculates the first correction coefficient LC by means of bilinear operation processing of the first correction coefficients LC(m) and LC(m+1) selected by the selector 132L.

The bilinear operation section 133S calculates the second correction coefficient SC by means of bilinear operation processing of the second correction coefficients SC(m) and SC(m+1) selected by the selector 132S.

The multiplier section 134 multiplies first correction coefficient LC and second correction coefficient SC to calculate the correction coefficient $\alpha (= LC \times SC)$.

Figure 7:
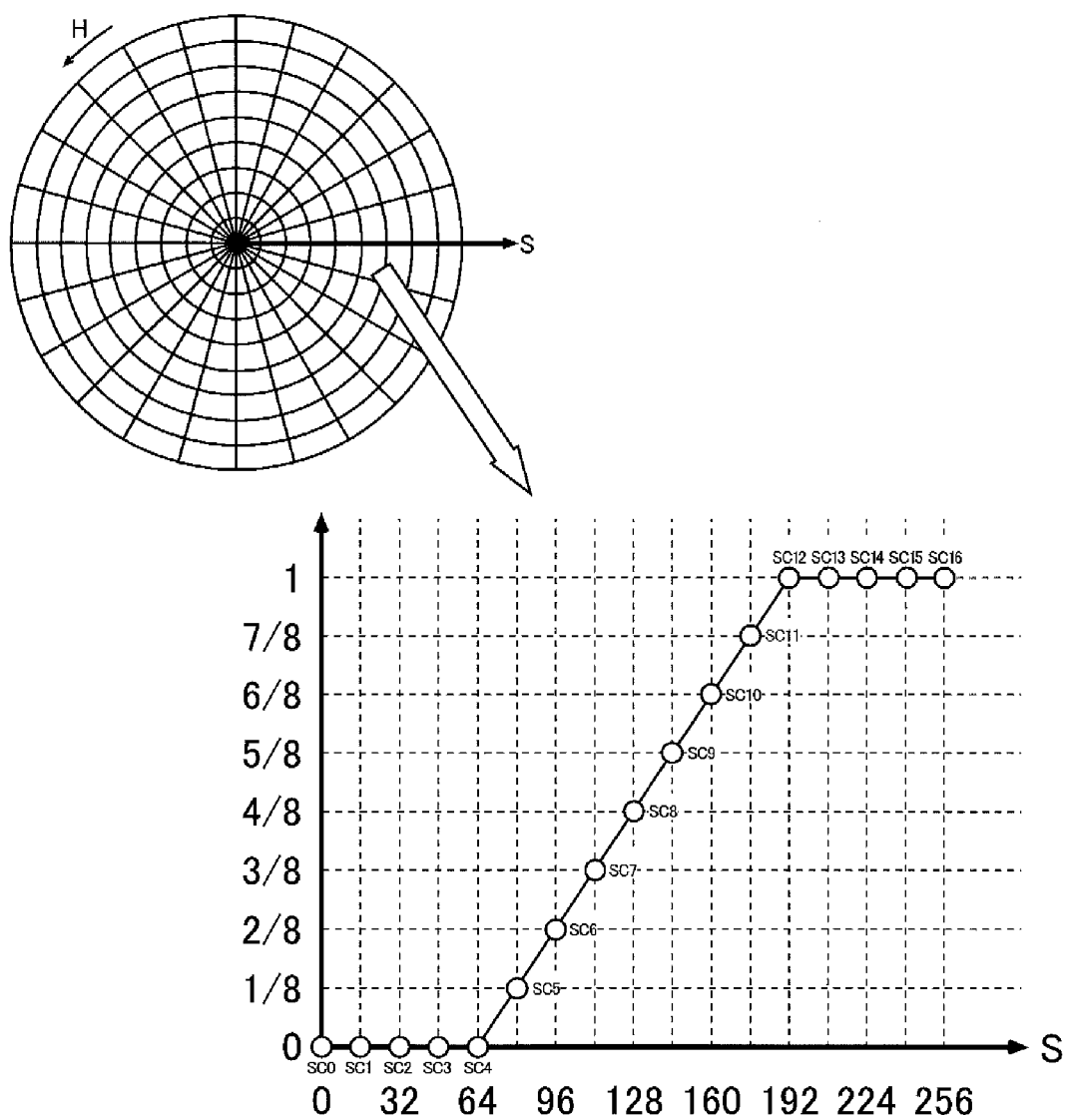
FIG. 7 is a graph of the correlation between saturation S and second correction coefficients SC0 through SC16.

FIG. 7 is a graph of the correlation between saturation S and second correction coefficients SC0 through SC16. This correlational graph is stored in the register 170 as the second correction coefficient table TBL_S. However, as mentioned above, a user can rewrite the contents of the second correction coefficient table TBL_S at will, and the correlational graph of FIG. 7 is merely one example thereof. By replacing "S" with "L", the graph can also be understood as a graph showing the correlation between lightness L and the first correction coefficients LC0 through LC16 (i.e., as first correction coefficient table TBL_L).

The second correction coefficients SC0 through SC16 can be set at will to values between 0 and 1 at intervals of ⅛. For example, when one wishes to diminish the color correction performed on pixels having low saturation S, SC0 through SC16 can be set according to the pattern shown in FIG. 7.

A configuration in which the correction amount Y is adjusted according to the lightness L and saturation S of the input image data D1 in this way allows unnecessary amplification of noise accompanying color correction to be suppressed.

Figure 8:
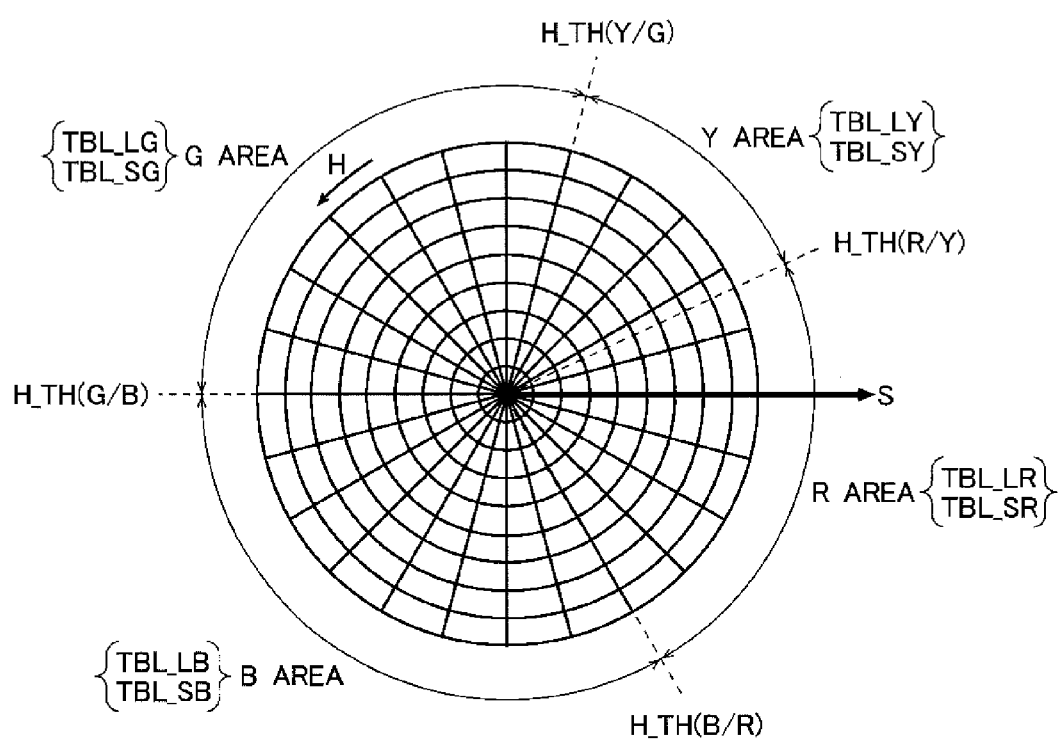
FIG. 8 is a diagram of a hue/saturation plane showing area-by-area settings examples for a correction coefficient table TBL.

FIG. 8 is a diagram of a hue/saturation plane showing area-by-area settings examples for a correction coefficient table TBL. As described above, the first correction coefficient table TBL_L and the second correction coefficient table TBL_S are provided in a plurality of patterns (for example, for the red (R) area, for the green (G) area, for the blue (B) area, and for the flesh (Y) area) corresponding to the hue H of the input image data D1. Thus, the first correction coefficient table TBL_L and second correction coefficient table TBL_S having the plurality of patterns corresponding to the hue H of the input image data D1 are referred to by the correction coefficient calculation section 130.

Such a configuration allows appropriate color correction processing to be performed according to the hue H of the input image data D1. In particular, by providing an independent first correction coefficient table TBL_LY and second correction coefficient TBL_SY for the flesh (Y) area, color correction processing specialized for human skin color correction can be performed.

A hue (H) threshold value H_TH(R/Y) establishing the border between the red (R) area and the flesh (Y) area, a hue (H) threshold value H_TH(Y/G) establishing the border between the flesh (Y) area and the green (G) area, a hue (H) threshold value H_TH(G/B) establishing the border between the green (G) area and the blue (B) area, and a hue (H) threshold value H_TH(B/R) establishing the border between the blue (B) area and the red (R) area may be set as fixed or as variable values. For example, when no specialization for skin color correction is necessary, the threshold value H_TH(R/Y) and threshold value H_TH(Y/G) may be set to the same value.

<Application>

The image processing IC 100 described above can be installed in a variety of applications handling image data.

Figure 11:
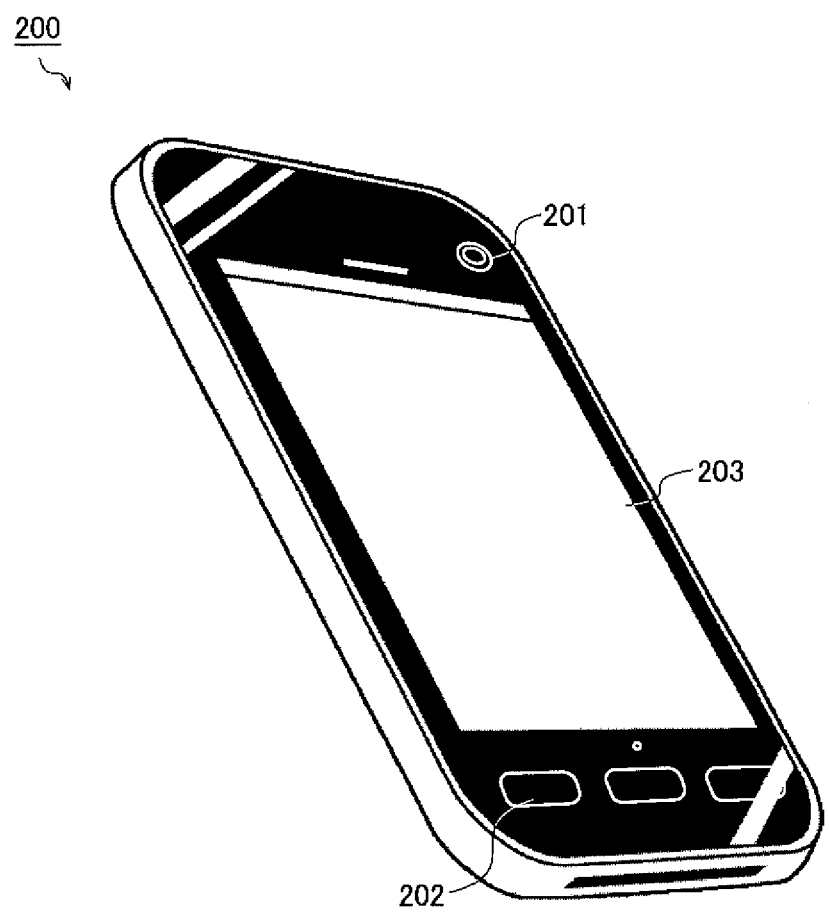
FIG. 11 is an external view of a mobile telephone (smartphone).

FIG. 11 is an external view of a mobile telephone (smartphone) installed with the image processing IC. A mobile telephone 200 having a configuration according to the present example has camera sections 201 on front and rear sides of a body, an operation section 202 (various types of buttons, touch panel, and the like) for accepting a user operation, and a display section 203 for displaying text and an image (including a camera image and a media replay image).

Figure 12:
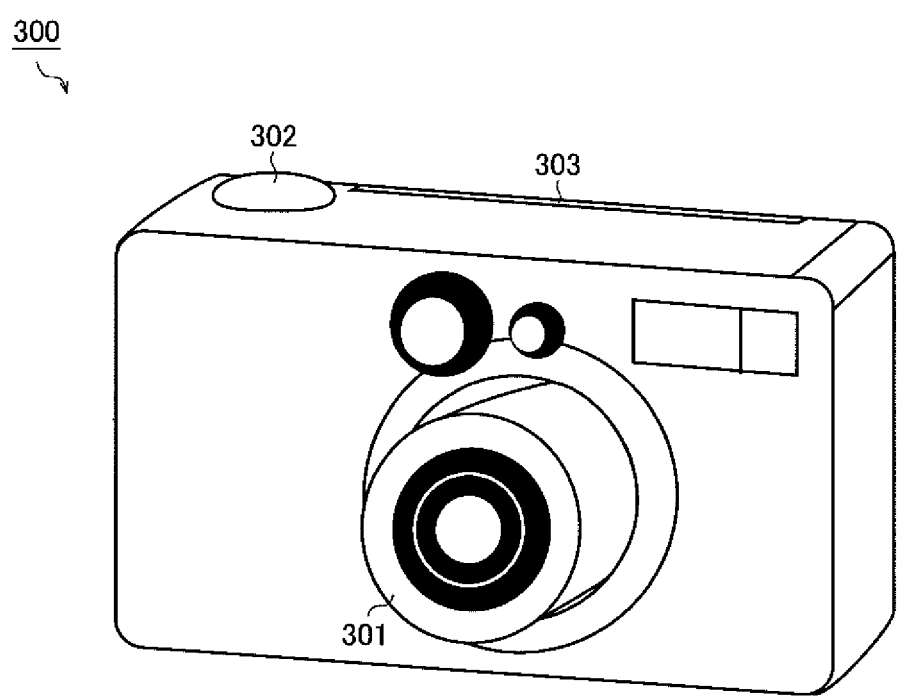
FIG. 12 is an external view of a digital still camera.

FIG. 12 is an external view of a digital still camera installed with the image processing IC. A digital still camera 300 having a configuration according to the present example has a camera section 301 for shooting a still picture, an operation section 302 (release button, zoom button, and the like) for accepting user operations, and a display section 303 for displaying a camera image and a menu screen.

Figure 13:
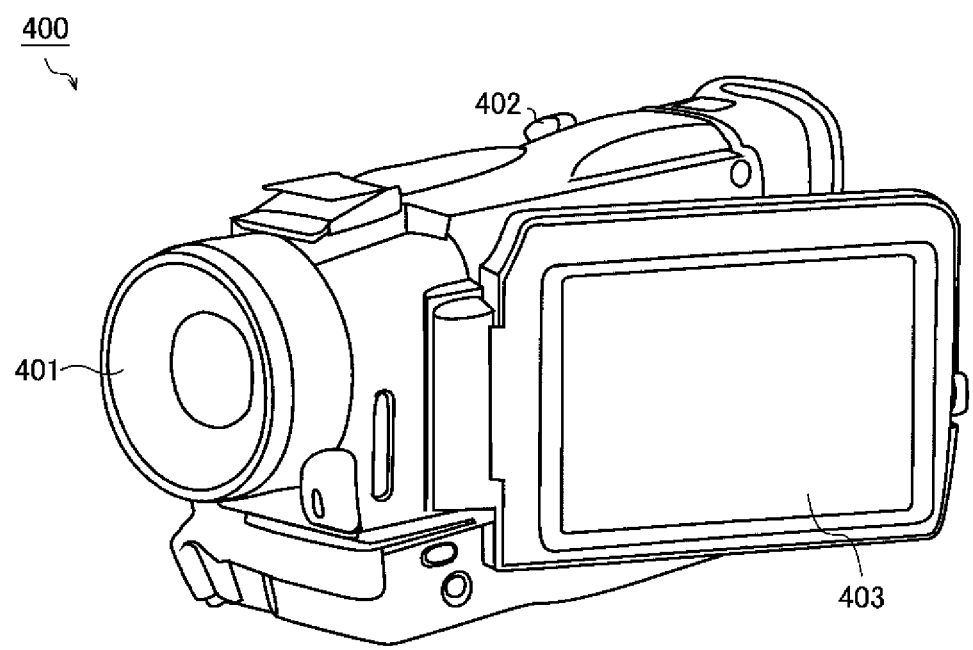
FIG. 13 is an external view of a digital video camera.

FIG. 13 is an external view of a digital video camera installed with the image processing IC. A digital video camera 400 having a configuration according to the present example has a camera section 401 for shooting a video, an operation section 402 (a start/stop recording button, a zoom lever, and the like) for accepting user operations, and a display section 403 for displaying a camera image and a menu screen.

Figure 14:
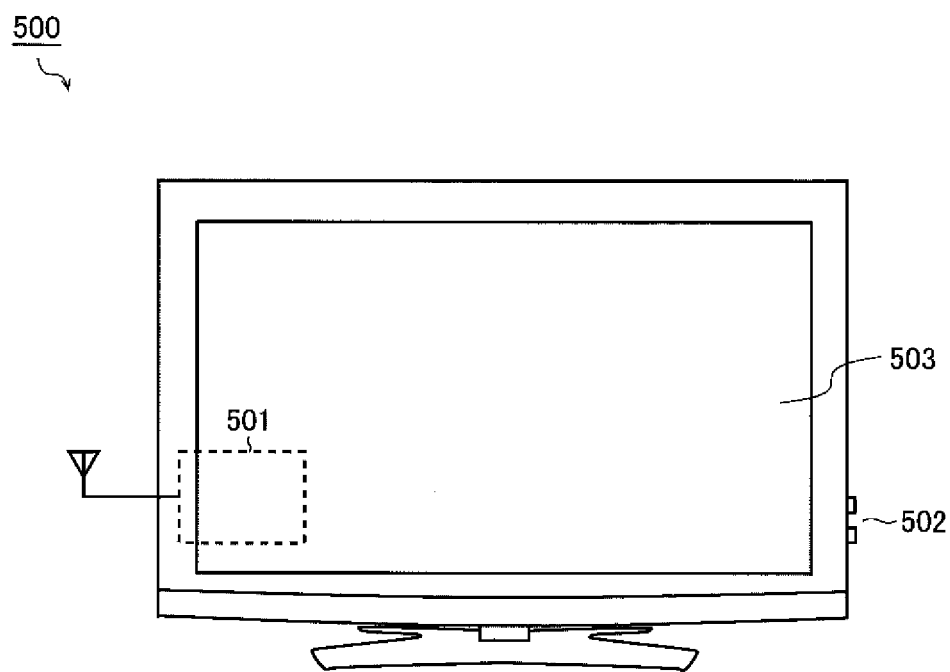
FIG. 14 is an external view of a television broadcast receiver device.

FIG. 14 is an external view of a television broadcast receiver device installed with the image processing IC. A television broadcast receiver device 500 having a configuration according to the present example has a tuner section 501 for receiving broadcast signals, an operation section 502 (channel selection button, volume button, and the like) for accepting user operations, and a display section 503 for displaying a received image.

Installing the image processing IC 100 described above in any of the foregoing applications enables appropriate correction processing to be performed on an input image (camera image, media replay image, and received image, and the like) and an output image to be formed, enabling the picture quality and visibility of the output image to be increased.

<Effects>

According to the present disclosure, it is possible to provide an image processing circuit capable of performing appropriate color correction processing, a semiconductor device into which the same is integrated, and an image processing device and electronic appliance using the same.

INDUSTRIAL APPLICABILITY

The disclosure of this application is a technology useful for increasing the picture quality and visibility of an output image of an image processing circuit for performing color correction processing upon input image data and for forming output image data, a semiconductor device into which the same is integrated, and an image processing device and electronic appliance using the same.

<Other Modifications>

In the foregoing embodiment, an example of a configuration in which the image processing circuit 100 was realized as hardware (the semiconductor device A1) was described; however, the present invention is not limited to this configuration, and it is also possible to cause a computer to operate as the image processing circuit 100 using software (an image processing program) recorded in and executed by a computer.

In the foregoing embodiment, an example of a semiconductor device A1 handling RBG format input image data DI and output image data DO was described; however, the present invention is not limited to this configuration, and a configuration in which input image data DI and output image data DO of a different data format (YUV format or the like) is also acceptable. When the input image data DI and output image data DO are in HLS format to begin with, the first data format converter section 110 and second data format converter section 160 are unnecessary.

Various modifications within the spirit of the present invention can thus be made to the configuration of the present invention apart from the foregoing embodiment. In other words, the foregoing embodiment is exemplary in all respects, and should not be understood as limiting the scope of the invention. The technical scope of the present invention is indicated not by the foregoing embodiment but by the patent claims, and should be understood as comprehending all modifications of meaning and scope comparable to those of the patent claims.

What is claimed is:

1. An image processing circuit comprising:
a correction amount calculation section which calculates a correction amount from area-by-area correction amounts set respectively for two adjacent areas, corresponding to the hue of input image data, out of a plurality of areas into which a hue/saturation plane is divided;
a correction coefficient calculation section for calculating a correction coefficient according to the lightness or the saturation of the input image data;
a multiplier section for outputting a product of the correction amount and the correction coefficient;
a color correction processing section which generates output image data by subjecting the input image data to color correction processing according to an output of the multiplier section; and
a register for storing the area-by-area correction amounts referred to by the correction amount calculation section and a correction coefficient table referred to by the correction coefficient calculation section;
wherein the correction coefficient table includes:
a first correction coefficient table in which the lightness of the input image data and a first correction coefficient are associated, the first correction coefficient being set discretely with respect to the lightness of the input image data, and
a second correction coefficient table in which the saturation of the input image data and a second correction coefficient are associated, the second correction coefficient being set discretely with respect to the saturation of the input image data,
wherein the correction coefficient calculation section refers to the correction coefficient table and calculates the correction coefficient by supplementing areas between the discrete values of the first and second correction coefficients, respectively.

2. The image processing circuit according to claim 1, wherein:
the correction amount calculation section calculates correction amounts for the hue, lightness, and saturation of the input image data.

3. The image processing circuit according to claim 2, wherein the correction amount calculation section includes:
a first selector arranged to select and output area-by-area hue correction amounts for each of two areas corresponding to the hue of the input image data out of area-by-area hue correction amounts stored in the register,
a second selector arranged to select and output area-by-area lightness correction amounts for each of two areas corresponding to the hue of the input image data out of area-by-area lightness correction amounts stored in the register,
a third selector arranged to select and output area-by-area saturation correction amounts for each of two areas corresponding to the hue of the input image data out of area-by-area saturation correction amounts stored in the register,
a first bilinear operation section arranged to calculate hue correction amount by means of bilinear operation processing of area-by-area hue correction amounts outputted from the first selector,
a second bilinear operation section arranged to calculate lightness correction amount by means of bilinear operation processing of area-by-area lightness correction amounts outputted from the second selector, and
a third bilinear operation section arranged to calculate saturation correction amount by means of bilinear operation processing of area-by-area saturation correction amounts outputted from the third selector.

4. The image processing circuit according to claim 1, wherein:
a plurality of tables according to the hue of the input image data are provided; and
the correction coefficient calculation section selects and refers to the plurality of tables according to the hue of the input image data.

5. The image processing circuit according to claim 4, wherein the correction coefficient calculation section includes:
a first selector arranged to select one out of the plurality of patterns of the first correction coefficient table stored in the register corresponding to the hue of the input image data,
a second selector arranged to select one out of the plurality of patterns of the second correction coefficient table stored in the register corresponding to the hue of the input image data,
a third selector arranged to select and output two values corresponding to the lightness of the input image data out of the plurality of first correction coefficients included in the first correction coefficient table selected by the first selector,
a fourth selector arranged to select and output two values corresponding to the saturation of the input image data out of the plurality of second correction coefficients included in the second correction coefficient table selected by the second selector,
a first bilinear operation section arranged to calculate the first correction coefficient by means of bilinear operation processing of the two values selected by the third selector,
a second bilinear operation section arranged to calculate the second correction coefficient by means of bilinear operation processing of the two values selected by the fourth selector, and
a multiplier section arranged to multiply first correction coefficient and second correction coefficient so as to calculate the correction coefficient.

6. The image processing circuit according to claim 1, further comprising:
an interface section for rewriting a content of the register.

7. A semiconductor device comprising an integrated image processing circuit, wherein the integrated image processing circuit comprises:
a correction amount calculation section which calculates a correction amount from area-by-area correction amounts set respectively for two adjacent areas, corresponding to the hue of input image data, out of a plurality of areas into which a hue/saturation plane is divided;
a correction coefficient calculation section for calculating a correction coefficient according to the lightness and the saturation of the input image data;
a multiplier section for outputting the product of the correction amount and the correction coefficient;
a color correction processing section which generates output image data by subjecting the input image data to color correction processing according to an output of the multiplier section; and
a register for storing the area-by-area correction amounts referred to by the correction amount calculation section and a correction coefficient table referred to by the correction coefficient calculation section;

wherein the correction coefficient table includes:
  a first correction coefficient table in which the lightness of the input image data and a first correction coefficient are associated, the first correction coefficient being set discretely with respect to the lightness of the input image data, and
  a second correction coefficient table in which the saturation of the input image data and a second correction coefficient are associated, the second correction coefficient being set discretely with respect to the saturation of the input image data,
wherein the correction coefficient calculation section refers to the correction coefficient table and calculates the correction coefficient by supplementing areas between the discrete values of the first and second correction coefficients, respectively.

8. An image processing device comprising:
a semiconductor device having an integrated image processing circuit;
an image input section for supplying input image data to the semiconductor device; and
an image output section for receiving the output image data supplied from the semiconductor device; wherein:
the integrated image processing circuit comprises:
a correction amount calculation section which calculates a correction amount from area-by-area correction amounts set respectively for two adjacent areas, corresponding to the hue of input image data, out of a plurality of areas into which a hue/saturation plane is divided;
a correction coefficient calculation section for calculating a correction coefficient according to the lightness and the saturation of the input image data;
a multiplier section for outputting the product of the correction amount and the correction coefficient;
a color correction processing section which generates output image data by subjecting the input image data to color correction processing according to an output of the multiplier section; and
a register for storing the area-by-area correction amounts referred to by the correction amount calculation section and a correction coefficient table referred to by the correction coefficient calculation section;
wherein the correction coefficient table includes:
  a first correction coefficient table in which the lightness of the input image data and a first correction coefficient are associated, the first correction coefficient being set discretely with respect to the lightness of the input image data, and
  a second correction coefficient table in which the saturation of the input image data and a second correction coefficient are associated, the second correction coefficient being set discretely with respect to the saturation of the input image data,
wherein the correction coefficient calculation section refers to the correction coefficient table and calculates the correction coefficient by supplementing areas between the discrete values of the first and second correction coefficients, respectively.

9. An electronic appliance comprising:
a semiconductor device having an integrated image processing circuit; wherein
the integrated image processing circuit comprises:
a correction amount calculation section which calculates a correction amount from area-by-area correction amounts set respectively for two adjacent areas, corresponding to a hue of input image data, out of a plurality of areas into which a hue/saturation plane is divided;
a correction coefficient calculation section for calculating a correction coefficient according to the lightness and the saturation of the input image data;
a multiplier section for outputting the product of the correction amount and the correction coefficient;
a color correction processing section which generates output image data by subjecting the input image data to color correction processing according to an output of the multiplier section; and
a register for storing the area-by-area correction amounts referred to by the correction amount calculation section and a correction coefficient table referred to by the correction coefficient calculation section;
wherein the correction coefficient table includes:
  a first correction coefficient table in which the lightness of the input image data and a first correction coefficient are associated, the first correction coefficient being set discretely with respect to the lightness of the input image data, and
  a second correction coefficient table in which the saturation of the input image data and a second correction coefficient are associated, the second correction coefficient being set discretely with respect to the saturation of the input image data,
wherein the correction coefficient calculation section refers to the correction coefficient table and calculates the correction coefficient by supplementing areas between the discrete values of the first and second correction coefficients, respectively.

10. The electronic appliance according to claim 9, wherein the appliance is a mobile telephone.

11. The electronic appliance according to claim 9, wherein the appliance is a digital still camera.

12. The electronic appliance according to claim 9, wherein the appliance is a digital video camera.

13. The electronic appliance according to claim 9, wherein the appliance is a television broadcast receiver device.

* * * * *